United States Patent [19]
Bergmans et al.

[11] Patent Number: 5,943,368
[45] Date of Patent: Aug. 24, 1999

[54] TRANSMISSION, RECORDING AND REPRODUCTION OF A DIGITAL INFORMATION SIGNAL

[75] Inventors: Johannes W.M. Bergmans; Johannes O. Voorman; Hendrik D.L. Hollmann, all of Eindhoven, Netherlands

[73] Assignee: U.S. Philips Corporation, New York, N.Y.

[21] Appl. No.: 08/847,436

[22] Filed: Apr. 28, 1997

[30] Foreign Application Priority Data

Jul. 8, 1996 [EP] European Pat. Off. ............. 96201902

[51] Int. Cl.$^6$ ........................ H04L 27/04; H04B 14/06; H03M 7/00
[52] U.S. Cl. ............................ 375/295; 375/246; 341/59
[58] Field of Search ..................... 375/295, 276, 375/277, 361, 246, 247, 253; 341/59, 67, 63, 56, 58, 61

[56] References Cited

U.S. PATENT DOCUMENTS

| | | | |
|---|---|---|---|
| 5,095,484 | 3/1992 | Karabel et al. | 371/30 |
| 5,142,421 | 8/1992 | Kahlman et al. | 360/40 |
| 5,420,893 | 5/1995 | Ward | 375/368 |
| 5,469,462 | 11/1995 | Kahlman et al. | 375/232 |
| 5,760,718 | 6/1998 | Schouhamer Immink | 341/80 |

FOREIGN PATENT DOCUMENTS

0549030A1 6/1993 European Pat. Off. .

OTHER PUBLICATIONS

Roy D. Cideciyan, Francois Dolivo, Reto Hermann, Walter Hirt, Wolfgang Schott, "A PRML System for Digital Magnetic Recording", IEEE Journal on Selected Areas in Communications, vol. 10, No. 1, Jan. 1992, pp. 38–56.

Giovanni Cherubini, Sedat Olcer, Gottfried Ungerboeck "Transactions Papers–Adaptive Analog Equalization and Receiver Front–End Control for Multilevel Partial–Response Transmission Over Metallic Cables" IEEE Transactions on Communications, vol. 44, No.6, Jun. 1996, pp. 675–685.

R.O. Carter "Low–Disparity Binary Coding System" Electronics Letters, May 1965, vol. 1, No. 3, pp. 67–68.

Primary Examiner—Chi H. Pham
Assistant Examiner—Khai Tran
Attorney, Agent, or Firm—Steven S. Rubin

[57] ABSTRACT

A digital information signal is channel encoded into a channel signal. Data sequences in the channel encoded information signal that give rise to an analog signal, upon reproduction or reception, with a single frequency component at $f_b M$, are limited in length. M being an integer constant larger than 2 and $f_b$ being the bit frequency in the channel encoded information signal.

20 Claims, 4 Drawing Sheets

TRANSMISSION, RECORDING AND REPRODUCTION OF A DIGITAL INFORMATION SIGNAL

BACKGROUND OF THE INVENTION

1. Field of the Invention

The invention relates to an apparatus for transmitting a digital information signal via a transmission medium, to an apparatus for recording the digital information signal in a track on a record carrier, to a converter apparatus for converting an (n−1)-bit information word into an n-bit converted word, to a channel encoder for channel encoding (n−1)-bit information words into n-bit channel words, the channel encoder comprising the converter apparatus, and to a reconverter apparatus for reconverting an n-bit converted information word into an (n−1)-bit reconverted information word. Further, the invention relates to a method for transmitting.

2. Description of the Related Art

An apparatus as defined in the opening paragraph, for recording a digital information signal on a record carrier, is known from U.S. Pat. No. 5,142,421, document D1 in the list of related documents that can be found at the end of the specification. A further document related to the subject of recording of runlength limited sequences on magnetic record carriers is document D2 in the list of related documents.

The following information is presented with reference to recording and reproducing apparatuses. It should be noted however that the following discussion is equally well applicable to transmission systems.

Reproducing apparatuses for reproducing a digital information signal from a record carrier, more specifically a magnetic record carrier, are well known in the art. Reference is made in this respect to U.S. Pat. No. 5,469,462, document D3 in the list of related documents and EP-A 549,030, document D4 in the list of related documents.

Reproducing apparatuses often comprise an AGC circuit for gain control and a slope equalizer for equalization control of the signal read from a record carrier, so that clock and data recovery can be realized with the minimum amount of errors. Prior art reproducing apparatuses sometimes show a large error rate in the digital signal detected.

SUMMARY OF THE INVENTION

In accordance with the invention the apparatus for recording a digital information signal in a track on a record carrier comprises input means for receiving the digital information signal,
channel encoding means for channel encoding the digital information signal so as to obtain a channel encoded information signal, and,
outputting means for outputting the channel encoded information signal.

The channel encoding means are provided with means for restricting at least the length of data patterns in the channel encoded information signal that give rise upon reception to a signal that comprises substantially a single frequency component at a frequency $f_b/M$, where M is an integer constant larger than 2 and $f_b$ is the bit frequency in the channel encoded information signal.

The invention is based on the following recognition. Run-length-limited (RLL) modulation codes are widely applied in digital transmission and recording systems. They introduce one or more run-length constraints in the encoded data stream. A case in point is the k-constraint, which stipulates that runs of identical symbols are at most k+1 symbol intervals long. This constraint ensures that data transitions will occur regularly, thereby facilitating proper operation of the timing-recovery scheme in the data receiver. For systems that reject DC, the k-constraint is also beneficial to automatic gain control.

Modern transmission and recording systems tend to have little if any excess bandwidth. If a Nyquist-rate data pattern is transmitted or recorded and excess bandwidth is negligible, then the received signal will consist almost purely of noise. In this event it becomes fundamentally impossible to extract any control information for timing recovery, gain control or equalizer adaptation; and, as a result, the timing-recovery gain-control and adaption loops in the data receiver may misconverge. To avoid this anomaly it is desirable that Nyquist-rate data patterns have a restricted duration. This restriction may be achieved via a $k_2$ constraint that limits the maximum run-length of Nyquist-rate patterns to $k_2+1$ symbol intervals. The $k_2$ constraint per se does not appear to have been used previously, but it does emerge implicitly in existing modulation codes as a result of a constraint on the run-length of zero symbols at the output of a PRML channel, see eg. document D2.

While the k and $k_2$ constraints are necessary for adequate operation of all control loops, they need not be sufficient.

The present invention is concerned with the constraints that are needed to achieve sufficiency for a particular category of data receivers, namely those in which a slope equalizer is present. A slope equalizer is often employed for channels that have a gradual roll-off at high frequencies. The slope or degree of roll-off tends to be a priori uncertain and for this reason the slope equalizer must be adaptive. Variations of the gain of the channel are compensated for via an AGC circuit, while the slope equalizer compensates for unbalances between low and high frequencies.

In order to be able to jointly determine the gain and slope, the received signal must contain at least two distinct frequency components. If the transmitted data has only a single component within the pass-band of the channel for a prolonged period of time then AGC and slope equalizer may misconverge. To avoid this anomaly, the maximum run-length of data patterns that give rise to such a component is limited.

Practical transmission and recording systems always include one or more AC-couplings and tend to have little excess bandwidth. Their pass-band can, therefore, be considered to range from DC to the Nyquist frequency with both edge frequencies excluded.

Preferably, all data patterns that have at most a single frequency component within this pass-band should thus be limited in length in accordance with the present invention. Those are data patterns having a period of 3 T, 4 T and 6 T, where T is the bit time.

Therefore, in accordance with the invention, a modulation code is proposed that introduces constraints on one or more of those data patterns in the sense that their length should not exceed a predetermined length.

The invention further resides in a specific converter apparatus that can be used in the channel encoder comprised in the recording apparatus, and to a corresponding reconverter apparatus that can be used in a corresponding reproducing apparatus.

BRIEF DESCRIPTION OF THE DRAWINGS

These and other objects of the invention will become apparent from and elucidated further with reference to the embodiments described in the following figure description, in which.

DESCRIPTION OF THE PREFERRED EMBODIMENTS

Figure 1:
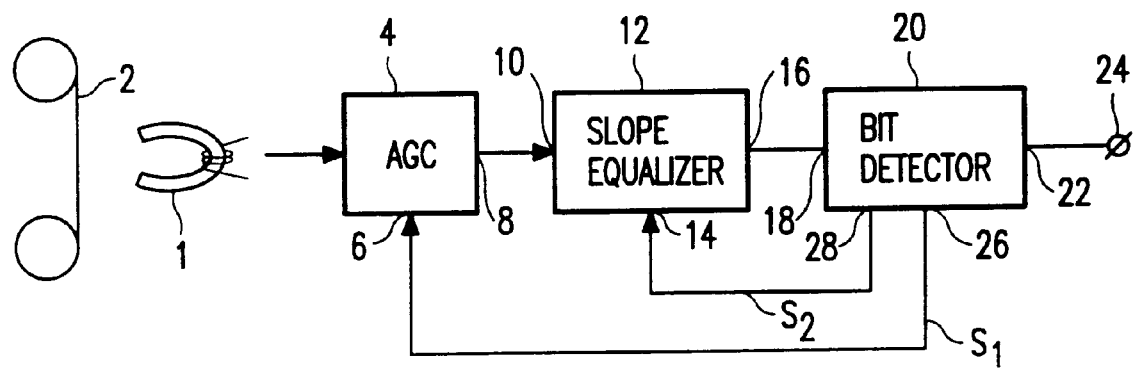
FIG. 1 shows a reproducing apparatus for reproducing a digital information signal recorded on a record carrier.

A reproducing apparatus for reproducing a digital information signal from a track on a record carrier generally comprises an automatic gain control circuit for controlling the amplitude of the reproduced information signal and a slope equalizer for controlling the frequency characteristic of the reproduced information signal. FIG. 1 shows an example of such reproducing apparatus. Reading means in the form of a magnetic read head 1 are present for reading information from a magnetic record carrier 2. The signal read from the record carrier 2 is supplied to an automatic gain control circuit 4, which has a control signal input 6 for receiving a gain control signal and an output 8 for supplying a gain controlled output signal. This signal is supplied to an input 10 of a slope equalizer circuit 12, which has a control signal input 14 and an output 16 for supplying an equalized output signal. The equalized output signal is supplied to an input 18 of a bit detector circuit 20. The bit detector circuit realizes a bit detection on the equalized output signal from the slope equalizer circuit 12 by means of an A/D converter included in the bit detector circuit, followed by a detection of for example a Viterbi detector. The sample rate for the A/D converter may be extracted from the signal itself. The reproduced information signal will be available on the output 22 of the bit detector circuit 20.

A control signal generator unit, not shown, but included in the bit detector unit 20, is present for supplying a first control signal $s_1$ to a control signal output 26 and for supplying a second control signal $s_2$ to a control signal output 28 of the bit detector unit 20. The control signal output 26 is coupled to the control signal input 6 of the automatic gain control circuit 4 so that the control signal $s_1$, controls the setting of the automatic gain control circuit 4. The control signal output 28 is coupled to the control signal input 14 of the slope equalizer circuit 12 so that the control signal $s_2$ controls the setting of the slope equalizer in the equalizer circuit 12.

The first and second control signals $s_1$ and $s_2$ can be derived in a well known way. Reference is made in this respect to the IEEE Transactions publication of Cherubini, document D5 in the list of related documents.

Figure 2:
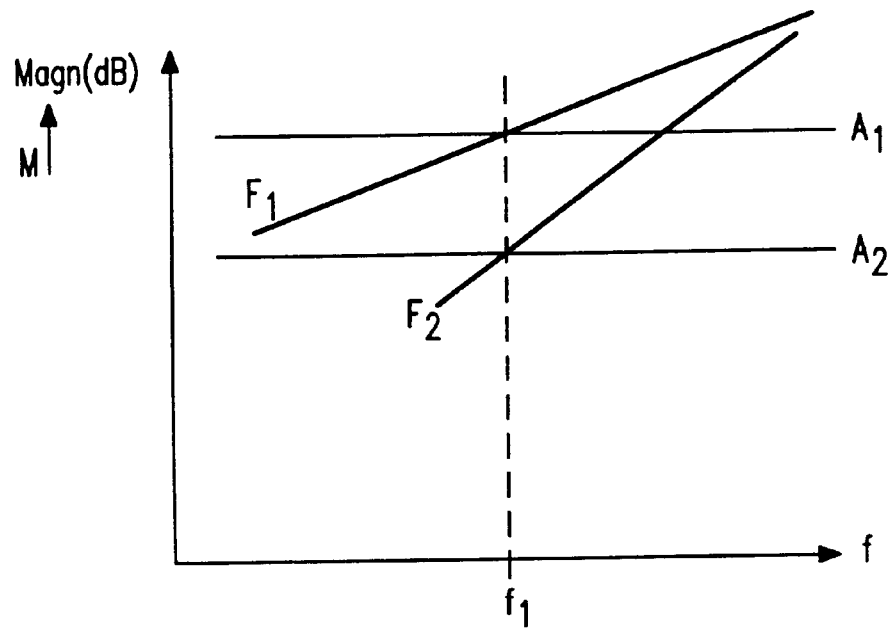
FIG. 2 shows the amplification of the signal read from the record carrier by means of the AGC circuit normally present in the reproducing apparatus and the equalization of the signal read from the record carrier by means of a slope equalizer normally present in the reproducing apparatus.

The functioning of the automatic gain control circuit 4 and the slope equalizer circuit 12 will be further explained with reference to FIG. 2. In response to the first control signal $s_1$, the AGC circuit 4 realizes an amplification on the signal applied to its input which is frequency independent. This is shown in FIG. 2 by means of the two lines $A_1$ and $A_2$, indicating two amplification factors $A_1$ and $A_2$ respectively in response to two different control signal values for the control signal $s_1$. In response to the second control signal $s_2$, the equalizer circuit 12 realizes a frequency dependent amplification on the signal applied to its input. This is shown in FIG. 2 by means of the two lines $F_1$ and $F_2$, indicating two different filter characteristics $F_1$, and $F_2$ respectively in response to two different control signal values for the control signal $s_2$.

In response to the signal read from the record carrier, the bit detector circuit 20 thus generates the two control signals $s_1$, and $s_2$, such that a correct bit detection results.

It is now assumed that the signal read from the record carrier is an analog reproduced signal comprising one frequency component. Said in other words: the frequency characteristic of the reproduced information signal read from the record carrier and which is in analog form, has one frequency component. Various data patterns in the digital information signal to be recorded lead to a reproduced information signal in analog form having a single frequency component. Examples of such digital data sequences are:

a 3 T pattern . . . 110110110110110 . . . . , the 4 T patterns . . . 1100110011001100 . . . , and =. . . 1110111011101110 . . . , a 6 T pattern . . . 111000111000111 . . . .

Other patterns are possible.

The first pattern given above leads to an analog signal having a single frequency component upon reproduction at the frequency value $f_b/3$, where $f_b$ is the bit frequency of the information signal, which equals 1/3 T, where T is the bit time interval in the digital information signal. The two 4 T patterns given above both lead to an analog signal upon reproduction having a single frequency component at the frequency value $f_b/4$, which equals 1/4 T, and the last pattern leads to an analog signal upon reproduction having a single frequency component at the frequency value $f_b/6$, which equals 1/6 T.

It should be noted that eg. the 3 T pattern also has a peak in the frequency spectrum at DC. The transmission channel (eg. the recording-reproduction path) is however not conducting for this frequency. In the same way, some of the patterns given above exhibit a peak in the frequency spectrum at the Nyquist frequency (which is 1/2 T). But in general, the transmission channel is also not conducting for the Nyquist frequency. As a consequence, the reproduced analog signal is generally devoid of a frequency peak at DC and the Nyquist frequency.

Suppose that, for a multi frequency component signal read from the record carrier, the bit detector circuit generates control signals $s_1$ and $s_2$ such that the AGC circuit is set to the value $A_1$ and the slope equalizer is set to the curve $F_2$. This results in the frequency dependent amplification factor $A_1.F_2$, which means a certain amplification factor $M(f_1)$ at the frequency value $f_1$. Suppose now that the contents of this signal changed into a single component signal having the frequency $f_1$. The amplification factor $M(f_1)$ is the correct amplification factor for this signal.

Suppose now that $A_1.F_2$ would be equal to $A_2.F_1$. In this situation, assuming that a single component signal having the frequency component $f_1$, is reproduced, control signals could be generated leading to the AGC circuit being set to the value $A_2$ and the slope equalizer being set to the curve $F_1$, again leading to the amplification factor $M(f_1)$, which is a correct setting for the single frequency component signal. However, as soon as other frequency components appear in the signal read from the record carrier, both the AGC and the slope equalizer are wrongly set, resulting in a highly erroneous bit detection, going out from the data read from the record carrier.

The invention is thus based on the recognition that single frequency digital information signal components recorded on the record carrier may, upon reproduction, result in a setting for the AGC circuit 4 and the slope equalizer circuit 12 which is correct for the single frequency signal components but may be erroneous as soon as a digital information signal including a plurality of frequency signal components is reproduced.

In accordance with the invention, the requirement thus exists that long data patterns in the digital information signal to be recorded that lead to an analog reproduced signal having one single frequency component, should not appear in the data stream to be recorded.

Figure 3:
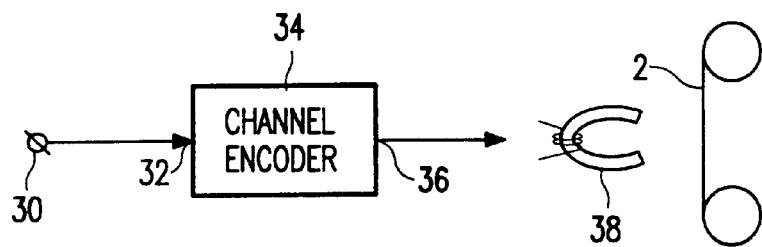
FIG. 3 shows a recording apparatus in accordance with the invention, provided with a channel encoder.

FIG. 3 shows an embodiment of an apparatus for recording a digital information signal on a record carrier. The apparatus comprises an input terminal 30 for receiving a digital information signal to be recorded. The input terminal 30 is coupled to an input 32 of a channel encoder circuit 34, which has an output 36 for supplying a channel encoded digital information signal to a write unit, which is in the present situation in the form of a magnetic write head 38, for writing the channel encoded digital information signal onto the record carrier 2, which may be a hard disk.

The channel encoder encodes the digital information signal in such a way that it is suitable for recording on the record carrier. Various constraints should be satisfied by the channel encoded information signal. One of such constraints is the k-constraint, indicating that the channel encoded information signal include at most k+1 'ones' or 'zeroes' after each other in the data sequence. Such constraint is necessary in order to realize a sufficient bitclock recovery during reproduction of the recorded information signal, and also in order to realize a correct AGC setting in the AGC circuit 4 in the reproducing apparatus. In addition, as explained above, the constraint should be posed on the channel signal to be recorded that long data patterns, such as the ones given above, and having one single frequency component should not appear in the data stream to be recorded.

Figure 3A:
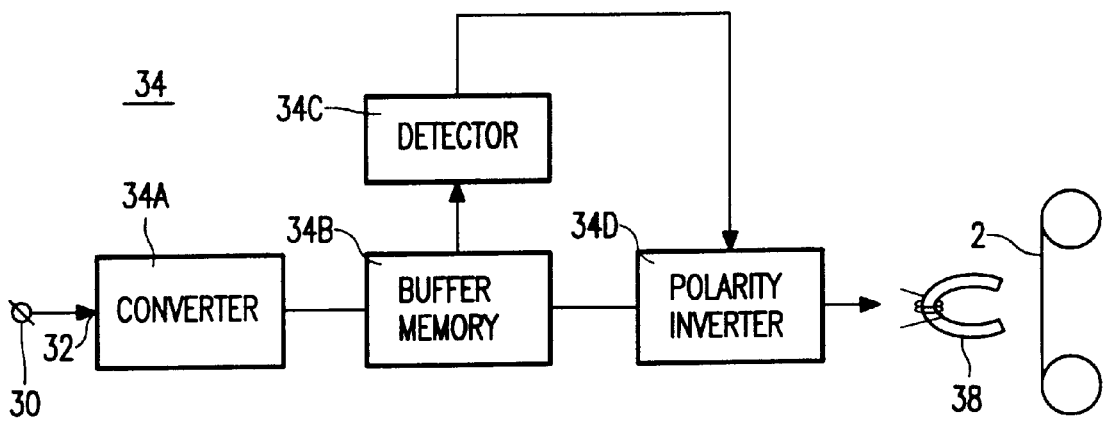
FIG. 3A shows a further elaboration of the apparatus of FIG. 3.

FIG. 3a shows a further elaboration of the apparatus of FIG. 3. The apparatus comprises a channel converter 34A, eg. for converting (n−1)-bit information words into n-bit channel words, in a manner well known in the art. Further, a buffer memory 34B is provided for storing a sufficient length of the sequence of converted data words. A detector unit 34C is available for detecting data patterns defined above, that lead to analog signals upon reproduction that comprise a single frequency component, which data patterns exceed a predetermined length. Upon such detection, a control signal is supplied by the detector 34C to a polarity inverter 34D. The polarity inverter inverts the sequence of converted datawords at a location that coincides with a data pattern defined above that exceeds the predetermined length. As a result, the data patterns exceeding the predetermined length above are cut into two halves, each half being shorter than said predetermined length. This will be explained in a further embodiment, which will follow below.

It should be noted that the encoder described with reference to FIG. 3a is a special form of a polarity bit encoder, such as described by R.O. Carter in document D6 in the list of related documents.

Figure 4:
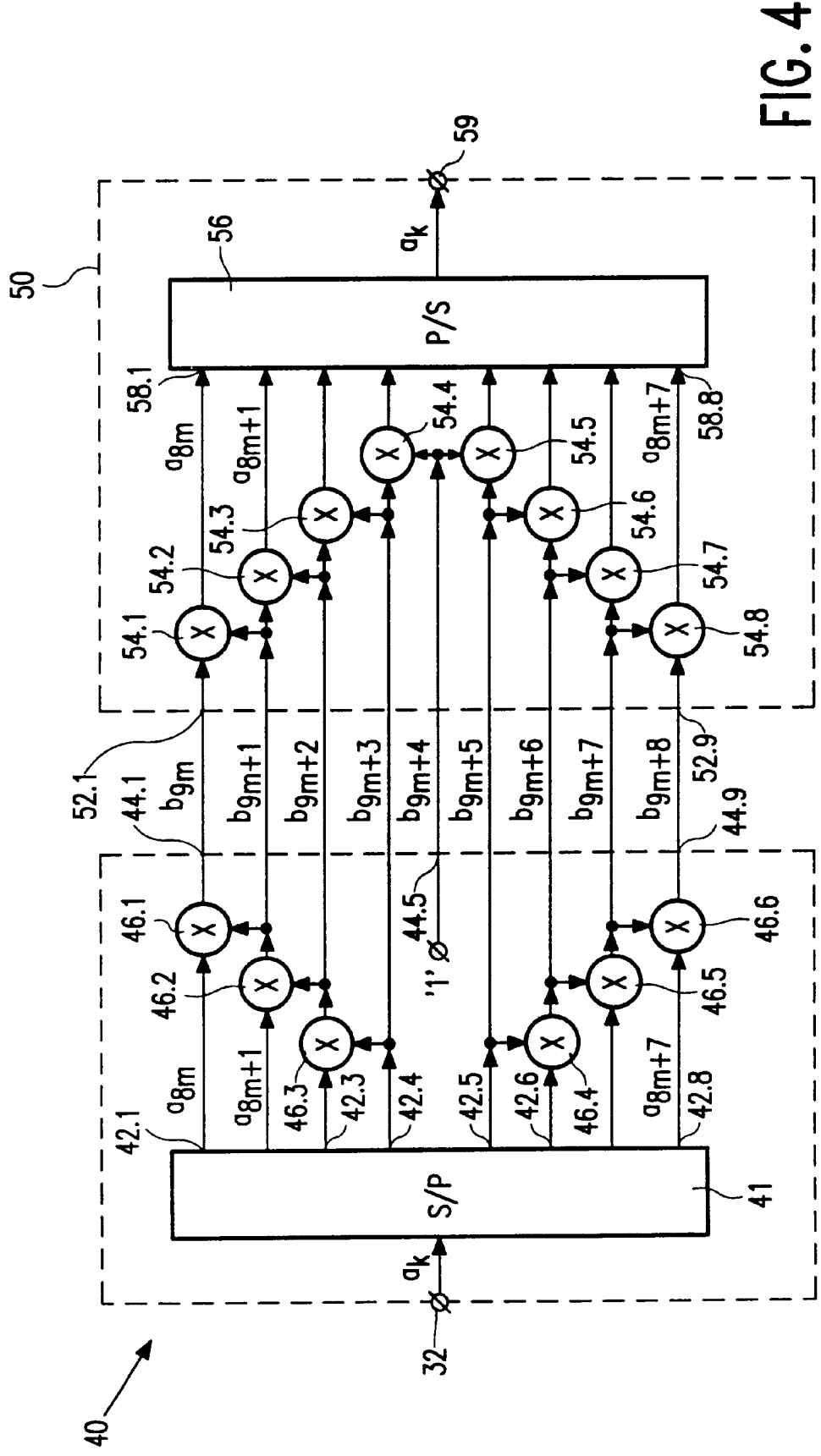
FIG. 4 shows an example of an 8-to-9 bit converter unit that can be used in the channel encoder of FIG. 3, and shows a 9-to-8 bit reconverter unit for reconverting the 9-bit converted words into the original 8-bit words.

FIG. 4 shows a converter for converting, as an example, 8-bit information words into 9-bit converted words, that can be used in a channel encoder capable of realizing the above objective, as well as a corresponding 9-to-8 bit reconverter that can be used in a corresponding channel decoder.

The channel encoder and the corresponding channel decoder will be shown in and discussed with reference to FIG. 5. FIG. 4 shows a bytewise converter 40 in which 8-bit information words are converted into 9-bit converted words. The input 32 of the converter 40 is coupled to a serial-parallel converter 41 which has, in the present example, eight outputs 42.1 to 42.8 to supply the bits $a_{8m}$ to $a_{8m+7}$ respectively of subsequent 8-bit information words supplied to the input 32. The converter 40 has nine outputs 44.1 to 44.9 to supply the nine bits of subsequent converted words. The output 44.5 is coupled to a terminal supplying a '1' bit. Further, the outputs 42.4 and 42.5 of the serial-parallel converter 40 are directly coupled to the outputs 44.4 and 44.6 respectively of the converter 40. The converter 40 is further provided with six multiplier units 46.1 to 46.6. Output 42.1 is coupled to a corresponding input of the multiplier unit 46.1, an output of which is coupled to the output 44.1 of the converter 40. Output 42.2 is coupled to a corresponding input of the EXOR gate 46.2, an output of which is coupled to the output 44.2 of the converter 40, as well as to a second input of the EXOR gate 46.1. Outputs 42.3 and 42.4 are coupled to corresponding inputs of the multiplier unit 46.3, an output of which is coupled to the output 44.3 of the converter 40, as well as to a second input of the multiplier unit 46.2. Outputs 42.5 and 42.6 are coupled to corresponding inputs of the multiplier unit 46.4, an output of which is coupled to the output 44.7 of the converter 40, as well as to a corresponding input of the multiplier unit 46.5. Output 42.7 is coupled to a second input of the multiplier unit 46.5, an output of which is coupled to the output 44.8 of the converter 40, as well as to a corresponding input of the multiplier unit 46.6. Output 42.8 is coupled to a second input of the multiplier unit 46.6, an output of which is coupled to the output 44.9 of the converter 40.

The corresponding reconverter 50 receive the nine bits of subsequent 9-bit converted words denoted $b_9m, \ldots, b_{9m+8}$ via inputs 52.1 to 52.9 respectively. The reconverter 50 is provided with eight multiplier units in the form of eight multiplier units 54.1 to 54.8 and a parallel-serial converter 56 having eight inputs 58.1 to 58.8 and an output which is coupled to the output 60 of the reconverter 50.

Inputs 52.1 and 52.2 are coupled to corresponding inputs of the multiplier unit 54.1, an output of which is coupled to the input 58.1 of the parallel-serial converter 56. Inputs 52.2 and 52.3 are coupled to corresponding inputs of the multiplier unit 54.2, an output of which is coupled to the input 58.2 of the parallel-serial converter 56. Inputs 52.3 and 52.4 are coupled to corresponding inputs of the multiplier unit 54.3, an output of which is coupled to the input 58.3 of the parallel-serial converter 56. Inputs 52.4 and 52.5 are coupled to corresponding inputs of the multiplier unit 54.4, an output of which is coupled to the input 58.4 of the parallel-serial converter 56. Inputs 52.5 and 52.6 are coupled to corresponding inputs of the multiplier unit 54.5, an output of which is coupled to the input 58.5 of the parallel-serial converter 56. Inputs 52.6 and 52.7 are coupled to corresponding inputs of the multiplier unit gate 54.6, an output of which is coupled to the input 58.6 of the parallel-serial converter 56. Inputs 52.7 and 52.8 are coupled to corresponding inputs of the multiplier unit 54.7, an output of which is coupled to the input 58.7 of the parallel-serial converter 56. Inputs 52.8 and 52.9 are coupled to corresponding inputs of the multiplier unit 54.8, an output of which is coupled to the input 58.8 of the parallel-serial converter 56. The parallel-serial converter 56 converts the 8-bit parallel words supplied to its inputs into a serial data sequence of the 8-bit reconverted words. The reconverted 8-bit words are identical to the original 8-bit words supplied to the input 32.

The key property of the reconverter 50 is its polarity-insensitivity, in the sense that a 9-bit converted word, as well as its corresponding in polarity inverted 9-bit word is reconverted by the reconverter 50 into the same 8-bit information word.

Further, the converter-reconverter combination as described above is such that one bit erroneously received by the reconverter 50 affects at most two consecutive bits in the reconverted word. It follows that error propagation in the reconverter is confined to at most two symbol intervals. Furthermore, errors do not propagate beyond word boundaries.

It should be noted here that a generalization of the converter of FIG. 4 to a converter for converting (n−1)-bit information words into n-bit converted words is straightforward, going out from the above given discussion of the 8-to-9 converter. The same can be said regarding a generalized reconverter. Such generalized converter and reconverter fully lie within the scope of the invention.

It should be noted here that the converter-reconverter combination as shown in FIG. 4 is meant to convert/reconvert digital signals having values {1,−1}, which is a notation for digital signals which is regularly used by transmission engineers. With such signals, the multiplier units are indeed real multipliers. The digital values {1,−1} have been obtained from a binary digital signal having 'zeroes' and 'ones', by converting the 'zeroes' into '−1' bits and the 'ones' into '1' bits.

The same converter-reconverter combination as shown in FIG. 4 could be used for directly converting-reconverting binary signals expressed in the 'normal' notation with 'zeroes' and 'ones'. In such situation, the multiplier units can be all in the form of EXOR gates or EXNOR gates. When using EXNOR gates in the converter, also EXNOR gates should be used in the reconverter. When using EXOR gates in the converter, it is necessary to apply a '0' bit to the terminal 44.5. Further, also in the reconverter unit EXOR gates should be used.

Figure 7:
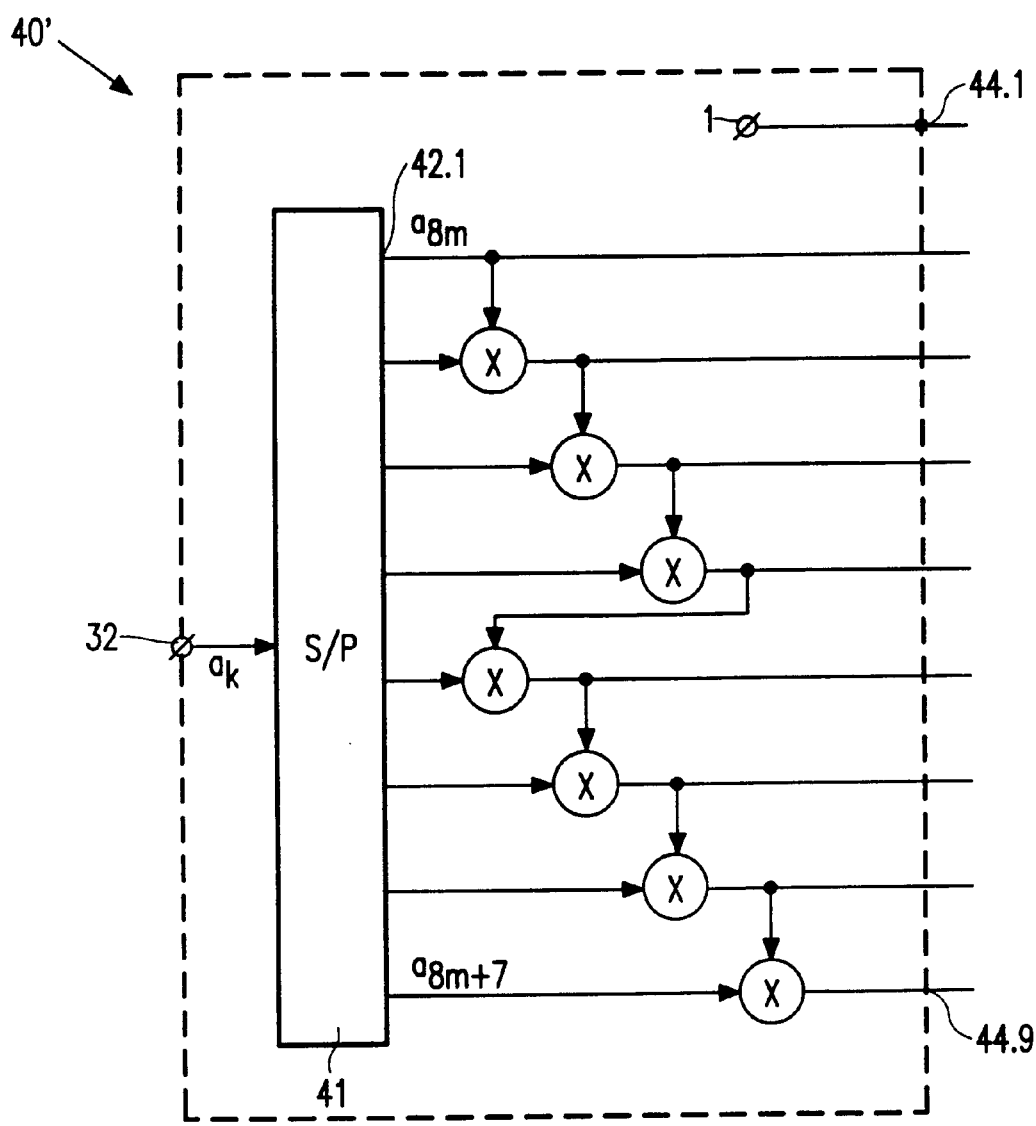

FIG. 7 shows another embodiment of the converter unit, denoted 40'. This converter unit 40' can also be used in cooperation with the reconverter unit 50. Because of the fact that the constant value '1' is now applied to the terminal 44.1, one further multiplier unit is present in the converter unit 40'. No further explanation of the converter unit 40' is required after the extensive explanation of the converter unit 40 of FIG. 4. It should further be noted that various other embodiments of the converter unit are possible, where the '1' value is applied to an other output terminal of the converter unit.

Figure 5:
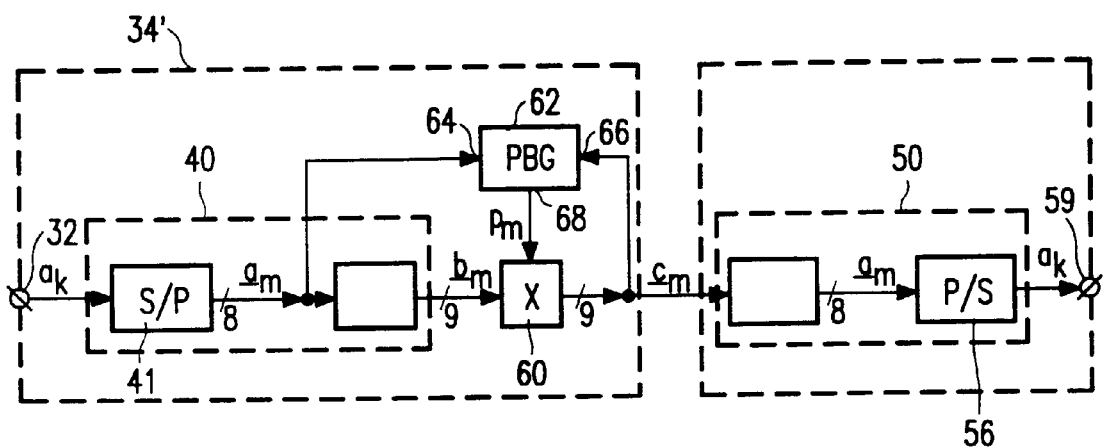
FIG. 5 shows the channel encoder provided with the converter unit of FIG. 4 and a corresponding channel decoder.

FIG. 5 shows an example of the channel encoder 34 of FIG. 3 for encoding the information words into channel words and shows the corresponding channel decoder that can be used for decoding the channel words generated by the channel encoder into the original information words. The channel encoder is denoted by the reference numeral 34' and comprises the converter 40 discussed above with reference to FIG. 4. The channel encoder 34' further comprises a polarity inverter circuit 60, which is capable of inverting the polarity of the converted datastream supplied by the converter unit 40 under the influence of a polarity control signal denoted $p_m$. Further, a control signal generator 62 is provided for generating the polarity control signal $p_m$ and supplying the signal $p_m$ to an output 68.

The polarity control signal is automatically generated for each bit, as will be explained later. By changing the polarity of the converted datastream, additional frequency components occur at the boundary where the polarity inversion occurs. During this moment, the AGC circuit 4 and the slope equalizer circuit 12 can be set to its correct setting. The polarity control signal generator circuit generates the polarity control signal Pm from the 8-bit original information words and the resulting 9-bit channel words and therefore has a first input 64 for receiving at least one bit of each of the 8-bit information words and a second input 66 for receiving at least one bit of each of the 9-bit channel words.

Figure 6:
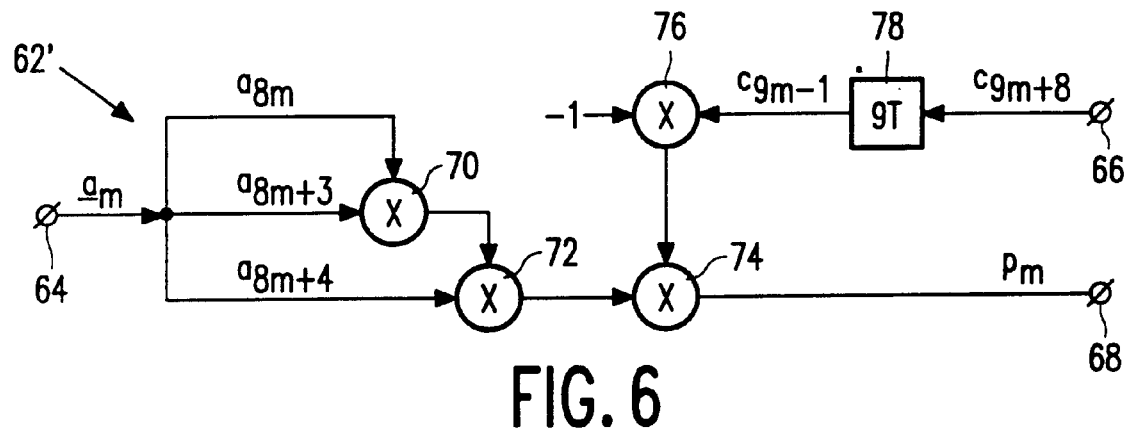
FIG. 6 shows an example of the polarity control signal generator used in the channel encoder of FIG. 5, and FIG. 7 another embodiment of the converter unit in the channel encoder.

FIG. 6 shows an example of a polarity control signal generator circuit 62, identified by the reference numeral 62'. The generator circuit 62' comprises multiplier units, in the form of multiplier unit 70 and 72. The multiplier unit 70 has first and second inputs for receiving the first (LSB) bit and the fourth bit of each (n−1)-bit information word. The output of the multiplier unit 70 is coupled to a first input of the multiplier unit 72. The second input of this multiplier unit circuit receives the fifth bit of each (n−1)-bit information word.

The generator circuit comprises two further multiplier circuits in the form of multiplier units 74 and 76. The output of the multiplier unit 72 is coupled to a first input of the multiplier unit 74, an output of which is coupled to the output 68 of the generator circuit 62'. The input 66 of the generator circuit 62' is coupled to a first input of the multiplier unit 76, via a delay circuit 78. An output of the multiplier unit 76 is coupled to a second input of the multiplier unit 74. A second input of the multiplier unit 76 receives a '−1' signal.

The last bit of the presently converted 9-bit word is supplied to the input 66 and delayed in the delay unit 78 over a time interval of 9 T. The. polarity control signal generated by the generator circuit 62' results in a restriction of the runlength of all the patterns discussed above to at most 14.

In the described embodiment of FIG. 6, it is again assumed that the digital signals in the circuit are in the {−1.1} notation. The circuit of FIG. 6 can be modified so as to process digital signals in the 'normal' binary notation {0,1}. This can be realized by replacing the multiplier units by EXNOR circuits. In that situation, a signal '0' should be applied to the second input of the unit 76.

When replacing the multiplier units by EXORs, the signal to be applied to the second input of the unit 76 should be a '1' signal.

It should be noted that, by using another polarity control signal generator, it is possible to realize other constraints for the signal to be recorded, such as a requirement that the signal to be recorded is DC free.

An 'optimum' polarity control signal generator that is capable of suppressing all the data patterns given above having a length of at least 9 data symbols, can be expressed by the following equation:

$$t_m = \bar{a}_5^{m-1} \cdot \bar{a}_6^{m-1} \cdot \bar{a}_7^{m-1} + \bar{a}_0^m \cdot \bar{a}_1^m \cdot \bar{a}_2^m + \bar{a}_6^{m-1} \cdot a_7^{m-1}$$
$$\cdot a_0^m \cdot \bar{a}_1^m + \bar{a}_5^{m-1} \cdot a_7^{m-1} \cdot \bar{a}_2^m + a_6^{m-1} \cdot \bar{a}_7^{m-1} \cdot a_7^{m-1} \cdot a_0^m \cdot \bar{a}_2^m + a_6^{m-1} \cdot a_7^{m-1} \cdot \bar{a}_0^m$$

where the overbar denoted logical negation and the '·' and '+' denote logical AND and OR operations, respectively.

This expression assumes that the underlying quantities have first been recast in the logic notation {0,1} according to the mapping '−1'→'1' and '+1'→'0'.

After having reconverted the quantity $t_m$ obtained into the notation {−1,1}, the polarity control signal $p_m$ can now be obtained from:

$$p_m = c_8^{m-1} \cdot b_m^0 \cdot t_m$$

where the '·' symbols now mean real multiplications in the sense as described with reference to the FIGS. 4 and 6.

Whilst the invention has been described with reference to preferred embodiments thereof, it is to be understood that these are not limitative examples. Thus, various modifications may become apparent to those skilled in the art, without departing from the scope of the invention, as defined in the claims. As an example, all embodiments described relate to recording and reproducing situations, either magnetic or optical. As explained earlier, the invention is equally well applicable in transmission systems, such as broadcast systems.

Further, the invention lies in each and every novel feature or combination of features, as herein disclosed.

List of related documents (D1) U.S. Pat. No. 5,142,421 (PHN 13.537)
(D2) IEEE Journal of selected areas in communications, Vol. 10, no. 1, Jan. 1992, pp. 38–56, R. D. Cideciyan et al, 'A PRML system for digital magnetic recording'.
(D3) U.S. Pat. No. 5,469,462 (PHN 14.147)
(D4) EP-A 549,030 (PHN 13.927)
(D5) IEEE Trans on Communications, Vol. 44, no. 6, June 1996, pp. 675–685, G. Cherubini et al, 'Adaptive analog equalization and receiver front-end control for multilevel partial-response transmission over metallic cables'.
(D6) Electronics letters, May 1965, Vol. 1, no. 3, R. O. Carter, 'Low-disparity binary coding system'.

We claim:

1. An apparatus for transmitting a digital information signal via a transmission medium, the apparatus comprising:
   input means for receiving the digital information signal,
   channel encoding means for channel encoding the digital information signal so as to obtain a channel encoded information signal having a bit frequency and data patterns, said data patterns having a length, and
   outputting means for outputting the channel encoded information signal,
   the channel encoding means being provided with means for restricting at least the length of data patterns in the channel encoded information signal that give rise upon reception to a signal that comprises substantially a single frequency component at a frequency $f_b/M$, where M is an integer constant larger than 2 and $f_b$ is the bit frequency in the channel encoded information signal.

2. An apparatus as claimed in claim 1, wherein M=3.

3. An apparatus as claimed in claim 1, the means for restricting being adapted to restrict the length of data patterns in the channel encoded information signal that give rise upon reception to a signal that comprises substantially a single frequency component at $f_b/4$.

4. An apparatus as claimed in claim 1, wherein the means for restricting are adapted to restrict at least the length of data patterns in the channel encoded information signal that give rise upon reception to a signal that comprises substantially a single frequency component at $f_b/N$, where N is an integer constant larger than 4.

5. An apparatus as claimed in claim 1, for recording the digital information signal in a track on a record carrier, the outputting means being adapted to write the channel encoded information signal in the track of said record carrier, the means for restricting being adapted to restrict at least the length of data patterns in the channel encoded information signal that give rise upon replay to a signal that comprises substantially a single frequency component at a frequency $f_b/M$, where M is an integer constant larger than 2 and $f_b$ is the bit frequency in the channel encoded information signal.

6. A converter apparatus for converting an n−1-bit information word into an n-bit converted word, where n−1 is an even integer number, the converter apparatus comprising:
   n−1 terminals for receiving the n−1-bit information word,
   n−3 signal combination units, each having first and second inputs and an output,
   n output terminals (44.1–44.9) for supplying the n-bit converted word,
      for an integer variable i where $1 \leq i \leq (n-3)/2$,
      the i-th terminal being coupled to the first input of the i-th signal combination unit (46.1), an output of which is coupled to the i-th output terminal (44.1) of the converter apparatus,
      the (n−1)/2-th terminal (42.4) being coupled to the second input of the (n−3)/2-th signal combination unit (46.3) as well as to the (n−1)/2-th output terminal (44.4) of the converter apparatus,
      the output of the (i+1)-th signal combination unit being coupled to the second input of the i-th signal combination unit,
      for an integer variable j where $(n+3)/2 \leq j \leq n-1$
      the j-th terminal (42.8) being coupled to the first input of the (j−2)-nd signal combination unit (46.6), an output of which is coupled to the (j+1)-st output terminal (44.9) of the converter apparatus,
      the (n+1)/2-th terminal (42.5) being coupled to the second input of the (n−1)/2-th signal combination unit (46.4) as well as to the (n+3)/2-th output terminal (44.6) of the converter apparatus,
      the output of (j−2)-nd signal combination unit being coupled to the second input of the (j−1)-st signal combination unit,
      the (n+1)/2-th output terminal (44.5) of the converter apparatus being coupled to a point of constant potential.

7. A converter apparatus as claimed in claim 6, wherein n equals 9.

8. A converter apparatus as claimed in claim 6, wherein the converter apparatus further comprises a serial-parallel converter having an input and n−1 outputs for converting n−1-bit information words supplied to the input in serial form into parallel form, each of the n−1 outputs of the serial parallel converter being coupled to a corresponding terminal of the n−1 terminals of the converter apparatus.

9. A channel encoder for channel encoding n−1-bit information words into n-bit converted words having a polarity, the channel encoder comprising the converter apparatus as claimed in claim 6, the channel encoder further comprising:
   polarity inversion means for inverting the polarity of the n-bit converted words supplied by the converter apparatus in response to a polarity control signal,
   polarity control signal generator means for generating said polarity control signal, and
   output means for supplying the n-bit channel words.

10. A channel encoder as claimed in claim 9, the polarity control signal generator means being adapted to generate said polarity control signal in response to the information words supplied to the converter apparatus and the channel words generated by the polarity inversion means.

11. A channel encoder as claimed in claim 10, the polarity control signal generator means being adapted to generate said polarity control signal in such a way that the datastream of channel words is devoid of data sequences having a single frequency component which is equal to $f_b/M$, and which exceed a predetermined time interval, where M is an integer constant larger than 2 and $f_b$ is the bit frequency in the channel encoded information signal.

12. A channel encoder as claimed in claim 11, wherein n=9, and the polarity control signal generator means comprises:

first input means for receiving the 8-bit information words, second input means for receiving the 9-bit channel words, output means for supplying the polarity control signal, first signal combination means having first and second inputs coupled to the first input means, said first signal combination means further having an output, second signal combination means having a first input coupled to the output of the first signal combination means, a second input coupled to the first input means and an output, third signal combination means having a first input coupled to the output of the second signal combination means, a second input and an output which is coupled to the output means, fourth signal combination means having a first input coupled to the second input means, a second input for receiving a signal of constant potential and an output coupled to the second input of the third signal combination means.

13. An apparatus for recording a digital information signal in a track on a record carrier, the apparatus comprising input means for receiving the digital information signal, the channel encoder as claimed in claim 10, so as to obtain a channel encoded information signal, and writing means for writing the channel encoded information signal in the track on the record carrier.

14. A converter apparatus for converting an n−1-bit information word into an n-bit converted word, where n is an integer number, the converter apparatus comprising n−1 terminals for receiving n−1-bit information word, n−2 signal combination units each having first and second inputs and an output, n output terminals for supplying the n-bit converted word, for an integer variable i where $1 \leq i \leq n-2$, the i-th terminal being coupled to the first input of the i-th signal combination unit, an output of which is coupled to the i-th output terminal of the converter apparatus, the (i+1)-st terminal being coupled to the second input of the i-th signal combination unit, and one further output terminal of the converter apparatus being coupled to a point of constant potential.

15. A converter apparatus as claimed in claim 7, wherein the converter apparatus further comprises a serial-parallel converter having an input and n−1 outputs for converting n−1-bit information words supplied to the input in serial form into parallel form, each of the n−1 outputs of the serial parallel converter being, coupled to a corresponding terminal of the n−1 terminals of the converter apparatus.

16. A reconverter apparatus for reconverting an n-bit converted information word into an n−1-bit reconverted information word, where n is an integer number, the reconverter apparatus comprising:

n input terminals for receiving the n-bit converted information word, n−1 signal combination units, each having first and second inputs and an output, n−1 terminals for supplying the n−1-bit reconverted word, for an integer variable i where $1 \leq i \leq n-1$, the i-th input terminal being coupled to the first input of the i-th signal combination unit, an output of which is coupled to the the i-th terminal of the reconverter apparatus, the (i+1)-th input terminal being coupled to the second input of the i-th signal combination unit.

17. A reconverter apparatus as claimed in claim 16, wherein n equals 9.

18. A reconverter apparatus as claimed in claim 16, wherein the reconverter apparatus further comprises a parallel-serial converter having n−1 inputs and one output for converting (n−1)-bit reconverted information words supplied to the n−1 inputs in parallel form into serial form, each of the n−1 inputs of the parallel-serial converter being coupled to a corresponding terminal of the n−1 terminals of the reconverter apparatus.

19. A method for transmitting a digital information signal via a transmission medium, the method comprising the steps of:

receiving the digital information signal, channel encoding the digital information signal so as to obtain a channel encoded information signal having a bit frequency and data sequences, said dat sequences having a length, outputting the channel encoded information signal, the channel encoding step comprising the substep of restricting at least the length of data sequences in the channel encoded information signal that have a single frequency component which is equal to $f_b/M$, where M is an integer constant larger than 2 and $f_b$ is the bit frequency in the channel encoded information signal.

20. A method as claimed in claim 19, for recording the information signal in a track on record carrier, the outputting step further comprising the substep of writing the channel encoded information signal in the track on the record carrier.

* * * * *

Disclaimer

5,943,368 — Johnannes W. M. Bergmans, Eindhoven (NL); Johannes O. Voorman, Eindhoven (NL); Hendrik D. L. Hollmann, Eindhoven (NL). MAGNETIC DISK WRITE CHANNEL WITH DAMPING NETWORK. Patent dated August 24, 1999. Disclaimer filed March 28, 2008, by the assignee, U.S. Philips Corporation.

Hereby enters this disclaimer to all claims of said patent.

*(Official Gazette, April 7, 2009)*